(12) United States Patent
Buzzi

(10) Patent No.: US 9,417,157 B2
(45) Date of Patent: Aug. 16, 2016

(54) WHEEL BALANCING MACHINE WITH A TIRE REMOVING DEVICE

(71) Applicant: Carlo Buzzi, Mandello del Lario (IT)

(72) Inventor: Carlo Buzzi, Mandello del Lario (IT)

( * ) Notice: Subject to any disclaimer, the term of this patent is extended or adjusted under 35 U.S.C. 154(b) by 200 days.

(21) Appl. No.: 14/169,422

(22) Filed: Jan. 31, 2014

(65) Prior Publication Data

US 2014/0251008 A1 Sep. 11, 2014

(30) Foreign Application Priority Data

Mar. 7, 2013 (IT) ................ M12013A0343

(51) Int. Cl.
| | | |
|---|---|---|
| *G01M 17/013* | (2006.01) | |
| *G01M 1/02* | (2006.01) | |
| *G01M 1/04* | (2006.01) | |

(52) U.S. Cl.
CPC .............. *G01M 17/013* (2013.01); *G01M 1/02* (2013.01); *G01M 1/045* (2013.01)

(58) Field of Classification Search
CPC ..... G01M 1/045; G01M 17/013; G01M 1/02; G01M 1/225
USPC ........ 73/460, 462, 487; 157/14–21; 301/5.21, 301/5.22
See application file for complete search history.

(56) References Cited

U.S. PATENT DOCUMENTS

| | | | | | |
|---|---|---|---|---|---|
| 2,201,982 | A * | 5/1940 | Bazarek | ................ | B60C 25/132 157/1.22 |
| 3,580,320 | A * | 5/1971 | Roberts | ................ | B60C 25/135 157/21 |
| 3,812,725 | A * | 5/1974 | Frank | ................ | G01M 1/22 73/462 |
| 4,423,633 | A * | 1/1984 | Coetsier | ................ | G01M 1/045 73/480 |
| 4,489,607 | A * | 12/1984 | Park | ................ | G01M 1/045 73/462 |
| 5,201,224 | A * | 4/1993 | Rogers | ................ | G01M 1/225 73/462 |
| 5,337,256 | A * | 8/1994 | Cunningham | ........ | G01L 1/2268 700/279 |
| 5,900,548 | A * | 5/1999 | Buzzi | ................ | G01M 1/045 73/487 |
| 6,779,400 | B1 | 8/2004 | Thelen et al. | | |
| 7,077,006 | B2 * | 7/2006 | Hansen | ................ | G01M 1/045 73/484 |
| 8,250,915 | B1 * | 8/2012 | Voeller | ................ | G01M 17/021 73/460 |
| 2003/0213301 | A1 * | 11/2003 | Buzzi | ................ | G01M 1/06 73/462 |
| 2005/0005686 | A1 * | 1/2005 | Oppermann | ........ | G01M 1/045 73/66 |
| 2005/0011262 | A1 * | 1/2005 | Cunningham | ........ | G01M 1/326 73/460 |

FOREIGN PATENT DOCUMENTS

| | | |
|---|---|---|
| EP | 0058860 | 9/1982 |
| EP | 2141474 | 1/2010 |
| WO | 2008095792 A2 | 8/2008 |

OTHER PUBLICATIONS

Extended European Search Report for corresponding application EP13197723.3; Report dated Jan. 20, 2014.

* cited by examiner

*Primary Examiner* — Michael A Lyons
*Assistant Examiner* — David L Singer
(74) *Attorney, Agent, or Firm* — Cantor Colburn LLP

(57) ABSTRACT

A wheel balancing machine having a tire removing device includes a rotation shaft upon which a wheel is mounted and elements for fixing the wheel to the rotation shaft. The device further includes a plate fixed rigidly to the tire removing device, and a tubular element connected to the plate which rotatably accommodates the rotation shaft. The wheel balancing device further includes a plurality of sensors fixed to the plate. The sensors are connected to the tubular element and adapted to measure the forces that constrain the tubular element when the rotation shaft and the wheel are turning and provide a measurement of the forces generated by the dynamic imbalance of the wheel. The plate includes a plurality of slots. The tire removing device includes arms with ends that engage in the plurality of slots to rigidly fix the wheel balancing device to the tire removing device.

9 Claims, 3 Drawing Sheets

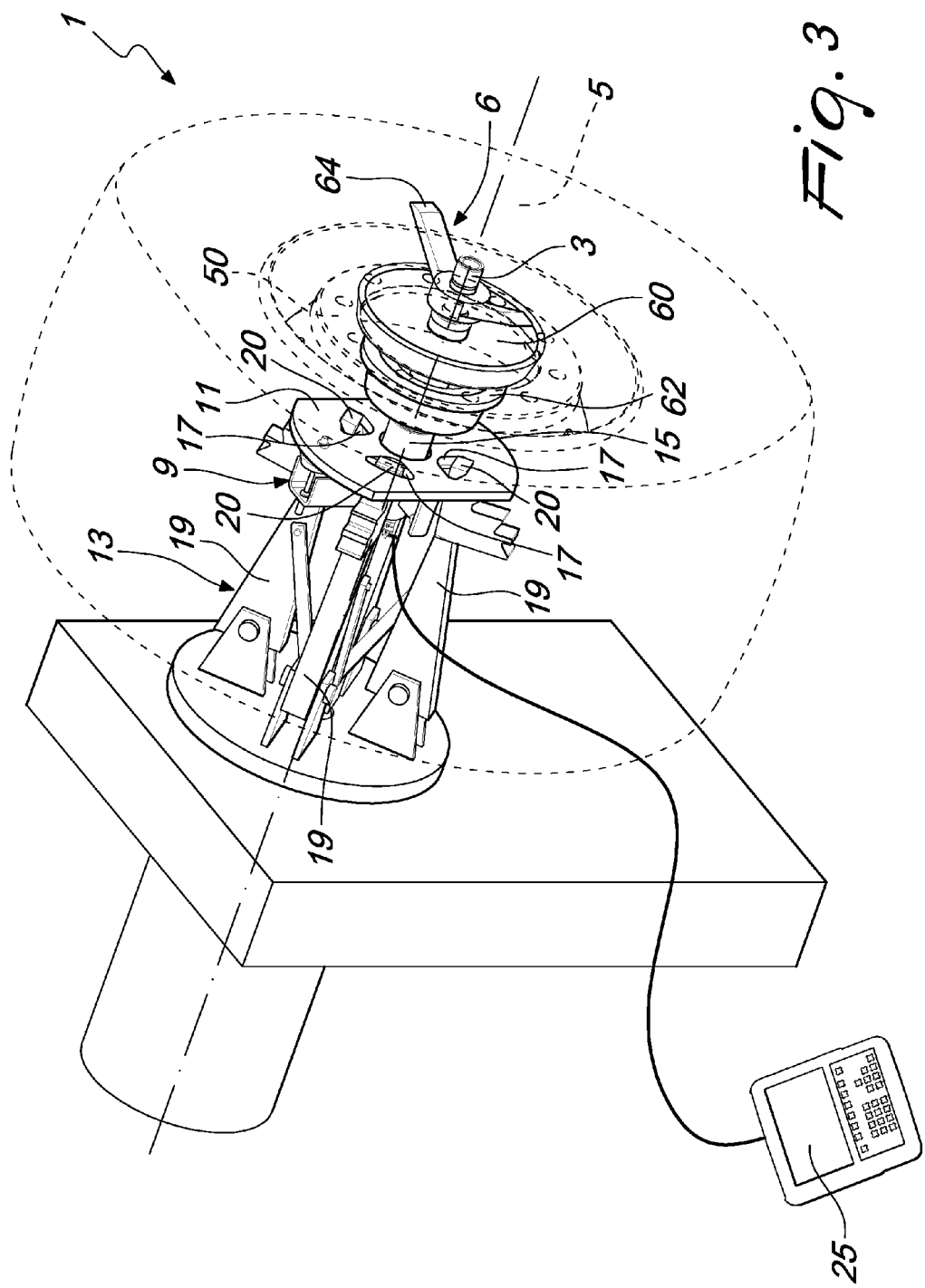

WHEEL BALANCING MACHINE WITH A TIRE REMOVING DEVICE

The present invention relates to a wheel balancing device.

BACKGROUND OF THE INVENTION

Two types of systems for determining the imbalance of a wheel on which a tire is fitted, and for thus balancing it by applying an appropriate weight in preset positions on said wheel, are currently known. The first type is known as static and allows determining the static imbalance of the wheel and the tire. In balancing systems of the static type, the wheel and the tire are not rotated but rather the wheel is centered and supported elastically in a horizontal position. A leveling device, for example provided with a spirit level or the like, the indicator of which moves away from a central reference point depending on the inclination of the wheel and therefore on the static imbalance, is applied to the wheel. The operator then proceeds by fixing adapted counterweights in strategic points of the wheel to return the indicator of the leveling device to the central reference point. This system, however, does not allow compensating for dynamic imbalances caused by the torque effects that act on the wheel.

The second type of system for determining the imbalance of a wheel is known as dynamic, since it allows determining the dynamic imbalance of a wheel, and therefore makes it possible to achieve a more accurate balancing thereof.

In systems of the dynamic type, the wheel to be balanced is mounted on a shaft which is rotated at a preset speed. When said speed is reached, the forces generated by the shaft due to the imbalance of the wheel are measured. Starting from these measurements, which are synchronized with angular rotation signal of the wheel, indications are obtained which relate to the degree of imbalance of the wheel, and therefore the positions and the weights of the counterweights to be applied in order to correct the imbalance are obtained.

Other than with systems of the static type, which can correct only imbalances on a single plane, with systems of the dynamic type it is possible to measure centrifugal forces and therefore also correct dynamic imbalance, i.e., torque imbalance.

Wheel balancing systems of the static and dynamic types are not free from drawbacks, which include the fact that they generally have very bulky and heavy structures, since they are dimensioned so as to be able to support the weight of the wheels, which, in the case of truck wheels, can be quite considerable, and are therefore scarcely maneuverable.

Another drawback of these systems of the known type resides in the fact that they are difficult to move, due to their considerable dimensions and weights; these systems are in fact intended to be used exclusively within garages and workshops.

A further drawback of these systems of the known type resides in the fact that due to their difficult transportability they cannot be used in rescue situations. Currently, particularly in the field of trucks, there are tire changing services that allow the replacement of damaged tires directly in the vicinity of the truck that requires it. On board these rescue vehicles there is a tire removal device that allows removal of the damaged tire and replacement of the same with a working one. However, once tire replacement has been performed, the driver, at a later time, must take care to perform the balancing of the new wheel, in order to benefit from the advantages of durability and comfort provided by a well-balanced wheel, and this causes a further expenditure of time and money.

SUMMARY OF THE INVENTION

The aim of the present invention is to provide a wheel balancing device that solves the problem described above, obviates the drawbacks and overcomes the limitations of the background art and can be transported manually without difficulty.

Within this aim, an object of the present invention is to provide a wheel balancing device that is compact.

Another object of the invention is to provide a wheel balancing device that can be transported easily on rescue vehicles to replace damaged wheels and can be used directly proximate to the vehicle the damaged wheel of which is to be replaced.

A further object of the invention is to provide a wheel balancing device that can be particularly maneuverable and easily usable even in garages and workshops, facilitating and speeding up the task of balancing a wheel.

Another object of the invention is to provide a wheel balancing device that facilitates the balancing of wheels of considerable size and weight, such as truck wheels.

A further object of the invention is to provide a wheel balancing device that is capable of giving the greatest assurances of reliability and safety of use.

Another object of the invention is to provide a wheel balancing device that is easy to provide and economically competitive if compared with the background art.

This aim, these objects and others that will become more apparent hereinafter are achieved by a wheel balancing device, comprising a rotation shaft on which a wheel can be mounted and means for fixing said wheel to said rotation shaft, characterized in that it comprises:
- a plate, which is adapted to be fixed rigidly to a tire removing device,
- a tubular element, which is connected to said plate, said tubular element accommodating rotatably said rotation shaft,
- sensor means, which are fixed to said plate, are connected to said tubular element and are adapted to measure the forces that constrain said tubular element when said rotation shaft and said wheel are turning and to provide a measurement of the forces generated by the dynamic imbalance of said wheel.

BRIEF DESCRIPTION OF THE DRAWINGS

Further characteristics and advantages of the present invention will become more apparent from the description of a preferred but not exclusive embodiment of a wheel balancing device, illustrated by way of non-limiting example with the aid of the accompanying drawings, wherein:

FIG. 3 is a perspective view of the wheel balancing device according to the invention, associated with the tire removing device of FIG. 1 and with a wheel to be balanced.

DESCRIPTION OF THE PREFERRED EMBODIMENTS

Figure 1:
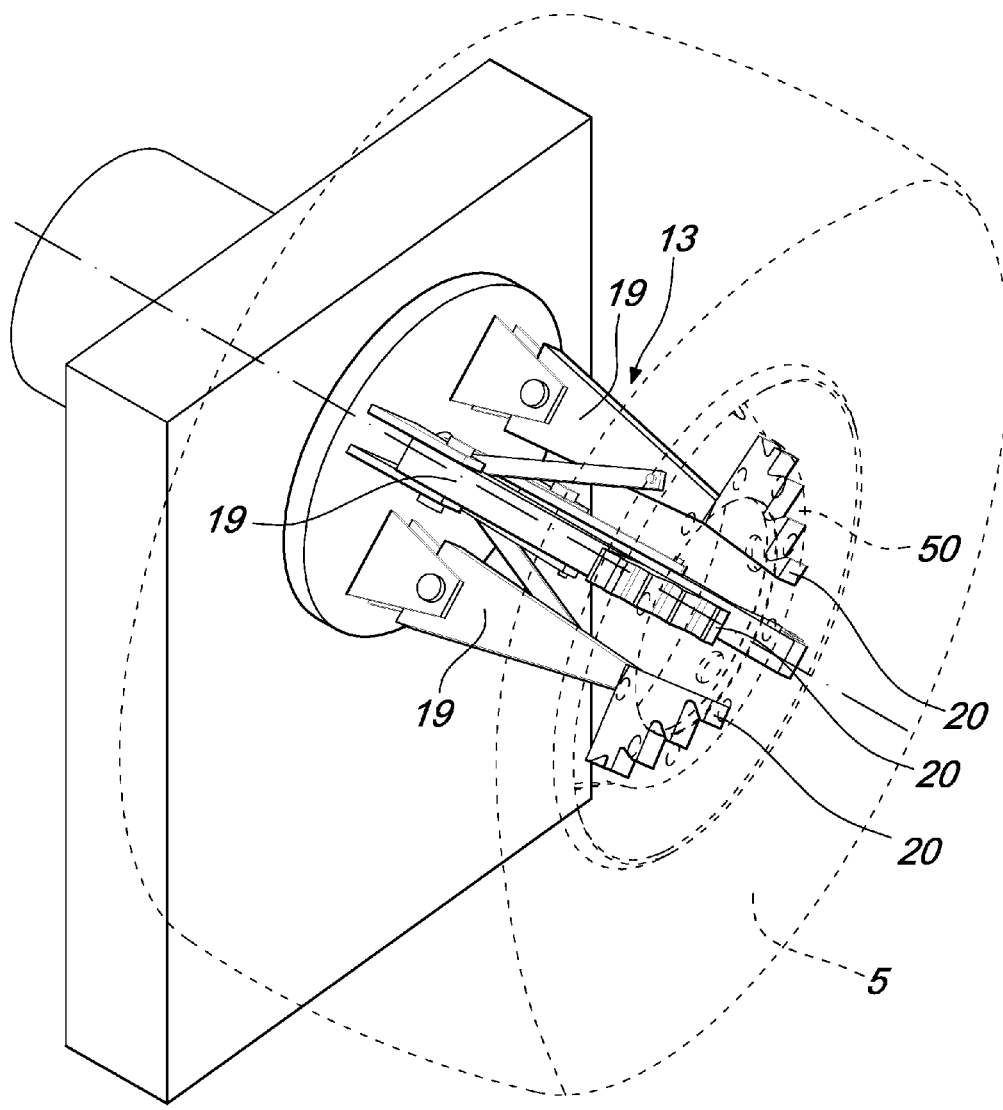
FIG. 1 is a perspective view of a tire removing device of a known type, to which the wheel balancing device according to the invention can be applied.
Figure 2:
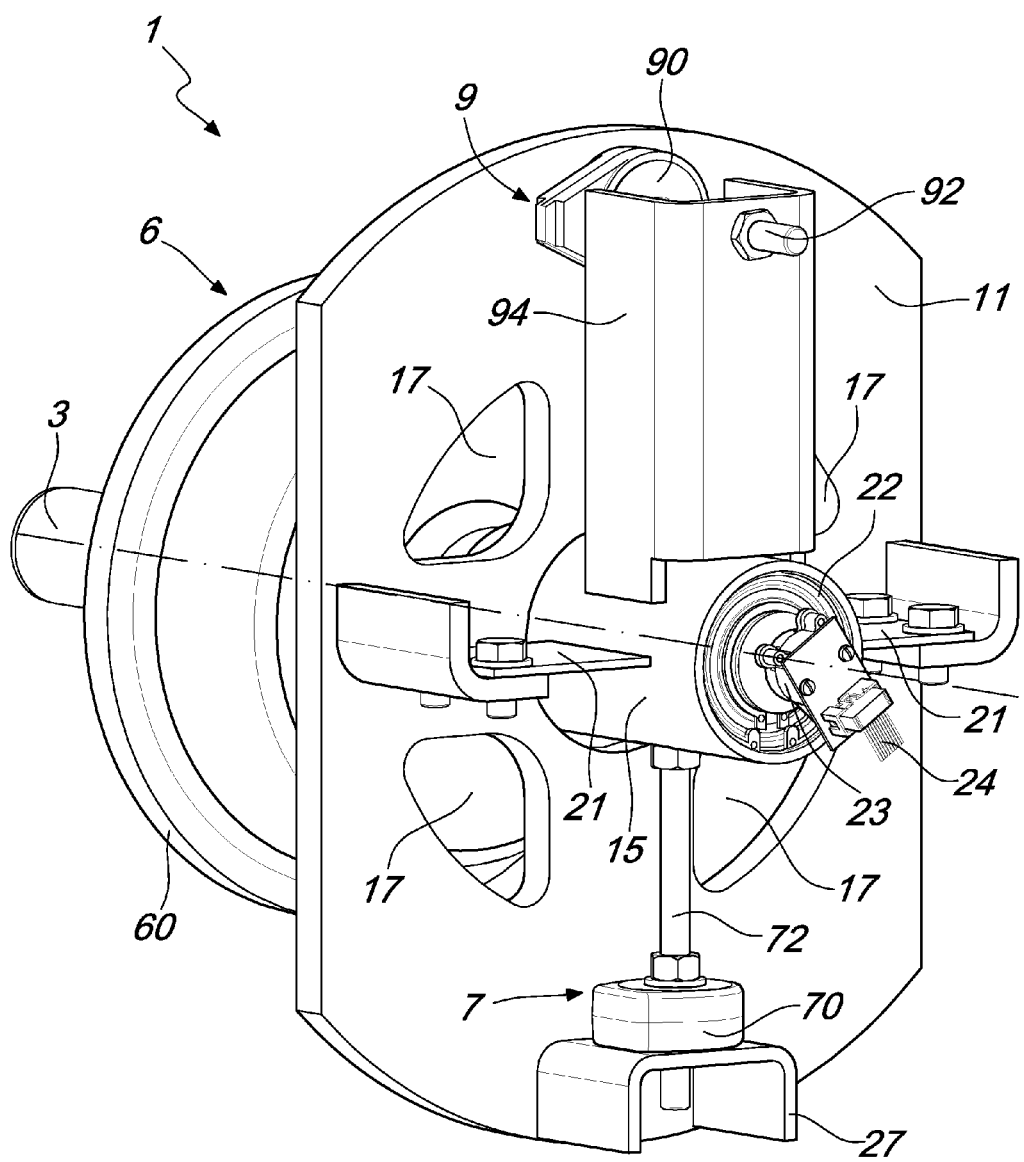
FIG. 2 is a perspective view of a wheel balancing device according to the invention.

With reference to the figures, a wheel balancing device, generally designated by the reference numeral 1, comprises a rotation shaft 3, on which it is possible to mount a wheel 5 to be balanced and means 6 for fixing the wheel 5 to the rotation shaft 3.

According to the invention, the wheel balancing device 1 comprises:
- a plate 11, which is adapted to be fixed rigidly to a tire removing device 13, such as the one shown in FIG. 1,
- a tubular element 15, which is connected to the plate 11 and accommodates rotatably the rotation shaft 3,
- sensor means 7, 9, which are fixed to the plate 11, are connected to the tubular element 15 and are adapted to measure the forces that constrain the tubular element 15 when the rotation shaft 3 accommodated therein and the wheel 5 are turning, and to provide a measurement of the forces generated by the dynamic imbalance of the wheel 5.

FIG. 1 is a view of an exemplary embodiment of a tire removing device 13 to which it is possible to apply the wheel balancing device 1. Tire removing devices of the known type generally comprise four arms 19, the ends 20 of which are adapted to engage the rim 50 of a wheel 5 for example at the central hole thereof. The arms 19 open hydraulically in a radial manner, locking the rim 50 and thus the wheel 5.

Advantageously, the wheel balancing device 1 can be fixed to a tire removing device 13 as if it were a rim of a wheel, by using the hydraulic opening of the arms 19. In particular, the plate 11 of the wheel balancing device 1 can comprise a plurality of slots 17 adapted to accommodate the ends 20 of the arms 19 of the tire removing device 13, for the rigid fixing of the balancing device 1 to the tire removing device 13. The ends 20 of the arms 19 of the tire removing device 13, by opening hydraulically, engage in the slots 17 of the plate 11 of the wheel balancing device 1, fixing it into place.

Advantageously, the tubular element 15 is connected to the plate 11 by means of a plurality of elastic laminae 21. These elastic laminae 21 support the tubular element 15, allowing its elastic deformation.

The rotation shaft 3 to which the wheel 5 is fixed is accommodated rotatably within the tubular element 5, for example by interposing bearings 22.

The sensor means 7, 9 fixed to the plate 11 and connected to the tubular element 15 can comprise a first sensor 70 that is connected by means of a first traction element 72 to the tubular element 15. Said first sensor 70 measures the dynamic imbalance component of the wheel 5 on a first plane that is substantially perpendicular to the rotation axis of the rotation shaft 3. The first sensor 70 is connected advantageously to the plate 11 by means of a bracket 27.

Furthermore, the sensor means 7, 9 can comprise advantageously a second sensor 90, which is connected by means of a second traction element 92 to a lever element 94, which is fixed to the tubular element 15. Said second sensor 90 measures the dynamic imbalance component of the wheel 5 on a second plane on which the rotation axis of the rotation shaft 3 lies. Such second plane is advantageously substantially perpendicular to the first plane.

The wheel balancing device 1 comprises advantageously also an angular position sensor 23, which is integral with the rotation shaft 3. The angular position sensor 23 is adapted to provide a signal for synchronization between the rotation of the wheel 5 and the measurement of the dynamic imbalance performed by the sensor means 7, 9.

The means 6 for fixing the wheel 5 to the rotation shaft 3 can comprise two coupling flanges 60 and 62. The rim 50 of the wheel 5 can be locked between the two coupling flanges 60 and 62 by fastening means 64.

The wheel balancing device 1 comprises advantageously portable electronic instruments 25 for processing, displaying and storing the measured data, conveniently connected to the balancing device 1 by electrical connection means 24.

Furthermore, the wheel balancing device 1 comprises advantageously rotation means for turning the wheel 5. The rotation means can comprise a manually actuated crank, which optionally can be uncoupled during the measurement of the imbalance, once a preset rotation rate of the wheel 5 has been reached, or motor means, suitable for example for electric actuation of the rotation of the wheel 5.

The wheel balancing device 1 has such dimensions that it can be fixed to the arms 19 of a tire removing device 13 and can be accommodated within a wheel rim of a truck. The fact that it can be accommodated within the rim of a wheel 5 makes it possible to reduce greatly the length of the rotation shaft 3 that supports the wheel, to the benefit of the rigidity of the device 1 itself.

Operation of the wheel balancing device is clear and evident from what has been described.

In particular, the operator who uses the known tire removing device 13 to mount a new wheel 5, as a replacement of a damaged wheel, before fixing the new wheel 5 to the tire removing device 13 can balance the new wheel 5 with the wheel balancing device 1.

As an alternative, an operator who wishes to balance a wheel in the vicinity of the vehicle itself can remove the wheel 5 by means of the tire removing device, then support the wheel 5 temporarily on the ground, mount the wheel balancing device 1 on the tire removing device 13, mount the wheel 5 on the rotation shaft 3 of the balancing device 1 and perform the balancing of the wheel 5 before mounting it back onto the vehicle.

The wheel 5 is turned either by a manually actuated crank or by adapted motor means; braking of the wheel 5 can be achieved easily by lowering the wheel 5 mounted on the tire removing device 13 and by making it slide by friction against the ground.

The rotation of the wheel 5 turns the rotation shaft 3, which transmits the dynamic imbalance forces to the tubular element 15, which, by being able to deform thanks to the elastic support provided by the elastic laminae 21 with respect to the plate 11 fixed to the tire removing device 13, causes the direct traction of the first traction element 72 and the traction, by means of the lever element 94, of the second traction element 92. The traction of the first traction element 72 and of the second traction element 92 affects respectively the first sensor 70 and the second sensor 90, which in this way measure the force transmitted by the tubular element 15 to the supporting structure and make it possible to obtain the dynamic imbalance values of the wheel 5.

The use of the wheel balancing device according to the invention is not limited to the wheels of trucks. It can in fact be provided conveniently with grip points adapted to engage tire removing devices for cars, for example by modifying the size, number and position of the slots 17 in the plate 11. As an alternative, the wheel balancing device can also be fixed rigidly to a workbench or to any rigid support by means of brackets, which conveniently pass through said slots 17.

In practice it has been found that the wheel balancing device according to the present invention achieves the intended aim and objects, since it can be transported easily proximate to the wheel to be moved.

Another advantage of the wheel balancing device according to the invention resides in the fact that it is particularly compact and consequently particularly rigid.

A further advantage of the wheel balancing device according to the invention resides in the fact that it can be applied easily to tire removing devices of a known type and therefore can be used flexibly in the most disparate situations, including rescue or emergency situations.

Another advantage of the wheel balancing device according to the invention resides in the fact that its use for wheel balancing does not require moving and lifting the wheels, which are often very heavy.

A further advantage of the wheel balancing device according to the invention resides in the fact that since it has such dimensions that it can be inserted within the rim of a truck wheel, the lever effects that act on the rotation shaft are reduced, to the full advantage of the rigidity of the system, which is essential for correct measurement of dynamic imbalance.

The wheel balancing device thus conceived is susceptible of numerous modifications and variations, all of which are within the scope of the appended claims.

All the details may furthermore be replaced with other technically equivalent elements.

In practice, the materials used, as long as they are compatible with the specific use, as well as the contingent shapes and dimensions, may be any according to the requirements.

The disclosures in Italian Patent Application No. MI2013A000343 from which this application claims priority are incorporated herein by reference.

What is claimed is:

1. A wheel balancing device, comprising a rotation shaft on which a wheel can be mounted and fixing means configured for connecting said wheel to said rotation shaft, further comprising:
    a plate, which is fixed rigidly to a tire removing device,
    a tubular element, which is connected to said plate, said tubular element accommodating rotatably said rotation shaft,
    sensor means, which are fixed to said plate, are connected to said tubular element and measure the forces that constrain said tubular element when said rotation shaft and said wheel are turning and provide a measurement of the forces generated by the dynamic imbalance of said wheel, wherein said plate comprises a plurality of slots wherein ends of arms of said tire removing device respectively engage in the plurality of slots of said plate for rigidly fixing said wheel balancing device to said tire removing device.

2. The wheel balancing device according to claim 1, wherein said tubular element is connected to said plate by means of a plurality of elastic laminae.

3. The wheel balancing device according to claim 1, wherein said sensor means comprise a first sensor that is connected by means of a first traction element to said tubular element, said first sensor measuring the dynamic imbalance component of said wheel on a first plane that is substantially perpendicular to a rotation axis of said rotation shaft.

4. The wheel balancing device according to claim 3, wherein said sensor means comprise a second sensor that is connected, by means of a second traction element, to a lever element, said lever element being fixed to said tubular element, said second sensor measuring the dynamic imbalance component of said wheel on a second plane, on which the rotation axis of said rotation shaft lies.

5. The wheel balancing device according to claim 1, further comprising an angular position sensor that is integral with said rotation shaft.

6. The wheel balancing device according to claim 1, wherein said fixing means comprise two coupling flanges, the rim of said wheel being lockable between said two coupling flanges by fastening means.

7. The wheel balancing device according to claim 1, further comprising electronic instruments for the processing, display and storage of the measured data.

8. The wheel balancing device according to claim 1, further comprising rotation means for turning said wheel, said rotation means comprising a manually actuated crank.

9. The wheel balancing device according to claim 1, further comprising rotation means for rotating said wheel, said rotation means comprising motor means.

* * * * *